(12) United States Patent
Singer

(10) Patent No.: US 7,424,787 B2
(45) Date of Patent: Sep. 16, 2008

(54) GARDEN BED ASSEMBLY AND METHOD AND KIT THEREFOR

(75) Inventor: Lisa R. Singer, Poway, CA (US)

(73) Assignee: Modular Merchants, Inc., San Diego, CA (US)

(*) Notice: Subject to any disclaimer, the term of this patent is extended or adjusted under 35 U.S.C. 154(b) by 234 days.

(21) Appl. No.: 11/073,072

(22) Filed: Mar. 4, 2005

(65) Prior Publication Data

US 2005/0193624 A1    Sep. 8, 2005

Related U.S. Application Data

(60) Provisional application No. 60/550,746, filed on Mar. 4, 2004.

(51) Int. Cl.
*A01G 9/20* (2006.01)
(52) U.S. Cl. .............................. 47/19.1; 47/66.1; 47/79
(58) Field of Classification Search .................. 47/65.5, 47/66.1, 66.3, 79, 17, 18, 19.1, 66.6
See application file for complete search history.

(56) References Cited

U.S. PATENT DOCUMENTS

| | | | | |
|---|---|---|---|---|
| 2,242,149 A | * | 5/1941 | Shelley ........................... | 47/86 |
| 2,860,805 A | * | 11/1958 | Katterjohn .................... | 217/69 |
| 3,912,407 A | * | 10/1975 | Heininger .................... | 403/205 |
| 4,068,423 A | * | 1/1978 | Marsh ............................ | 52/86 |
| 4,099,344 A | * | 7/1978 | Ruemeli ...................... | 47/19.1 |
| 4,242,833 A | * | 1/1981 | Maes, Jr. ....................... | 47/17 |
| 4,363,189 A | * | 12/1982 | O'Donnell, III ................ | 47/73 |
| 4,567,690 A | * | 2/1986 | Murrell ......................... | 47/17 |
| 4,901,473 A | * | 2/1990 | Taule .......................... | 47/66.1 |

* cited by examiner

*Primary Examiner*—T. Nguyen
(74) *Attorney, Agent, or Firm*—Bernard L. Kleinke; Duckor Spradling Metzger & Wynne

(57) ABSTRACT

There is disclosed a garden bed assembly, a kit and a method of making it. The garden bed assembly includes at least one raised garden bed planter box for containing suitable planting soil or other growing media. The assembly as disclosed herein includes a fence for at least partially surrounding the box, and includes a series of fence sections. Each section has an open rigid frame and an open mesh material such as poultry wire or hardware cloth, extending thereacross to permit sunlight as well as pollinating bees to enter the assembly while prohibiting unwanted creatures such as a gophers, rabbits and other animals from gaining access to the growing plants in the garden bed box.

9 Claims, 3 Drawing Sheets

US 7,424,787 B2

GARDEN BED ASSEMBLY AND METHOD AND KIT THEREFOR

RELATED APPLICATION

The application claims priority to U.S. provisional patent application, entitled GARDEN BED ENCLOSURE ASSEMBLY AND METHOD AND KIT THEREFOR, application No. 60/550,746, filed Mar. 4, 2004, and is incorporated herein by reference.

FIELD OF THE INVENTION

The present invention relates in general to a garden bed assembly and method of making it, as well as a kit therefor. It more particularly relates to a garden bed assembly, kit and method useful for growing plants such as fruits and vegetables, in a backyard or other setting.

BACKGROUND ART

There is no admission that the background art disclosed in this section legally constitutes prior art.

Amateur gardeners have attempted to establish and grow fruits and vegetables in a backyard setting, and have met with varying degrees of success. There have been a variety of reasons for less than desirable results.

For example, soil conditions vary widely, and amateur gardeners may not have the time or knowledge to properly prepare the soil for suitable growing conditions. Other deterrents to successful gardening of comestible products relate to creatures such as gophers, rabbits, and other animals, who will eat otherwise healthy plants.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings, wherein.

DETAILED DESCRIPTION OF CERTAIN EMBODIMENTS OF THE INVENTION

Figure 1:
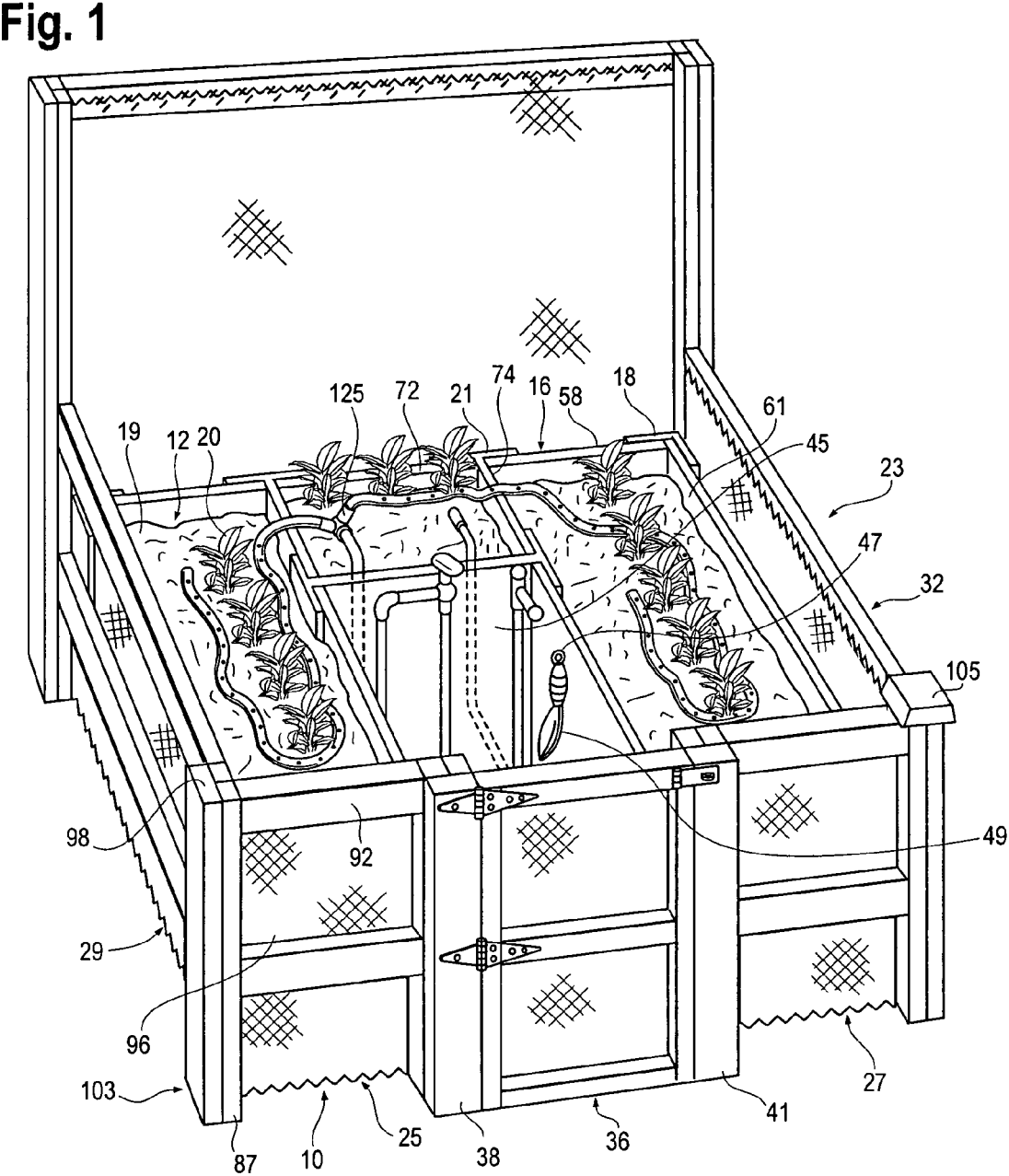
FIG. 1 is a fragmentary pictorial view of a garden bed assembly constructed according to an embodiment of the invention.

There is disclosed a garden bed assembly, a kit and a method of making it. The garden bed assembly includes at least one raised garden bed planter box for containing suitable planting soil or other growing media. The assembly as disclosed herein includes a fence for at least partially surrounding the box, and includes a series of fence sections. Each section has an open rigid frame and an open mesh material such as poultry wire or hardware cloth, extending thereacross to permit sunlight as well as pollinating bees to enter the assembly while prohibiting unwanted creatures such as a gophers, rabbits and other animals from gaining access to the growing plants in the garden bed box.

According to the disclosed embodiment of the invention, the box is positioned adjacent to at least one section of the fence to permit the plants growing in the soil or other growing media in the box to be supported by the adjacent fence section.

In accordance with certain embodiments of the present invention, there is provided a garden bed assembly which includes at least one planter box for holding planting media. The planter box may have a plurality of walls, and a plurality of brackets each helping to secure together two walls in an upright configuration. Each bracket may have at least one upstanding flange for being fastened to a face of one of the walls. The bracket may also have one horizontal flange for being fastened to the bottom edge of the one wall, and having a retainer spaced from the upright flange for receiving the wall therebetween. A fence may be provided for at least partially surrounding the planter box. The fence may include an arrangement of fence sections joined together at their ends to form posts. Each fence section has a pair of end rails, and a face rail may be provided to fasten to the adjoining fence section end rails to form a post.

According to a method of a disclosed embodiment of the invention, there is provided a method of constructing a garden bed structure including assembling at least one planter box of four upstanding walls. The assembling may include joining fixedly together the ends of a pair of walls with a corner bracket. The pair of walls are joined together at right angles to one another on a horizontal flange of the bracket between a retainer and an upstanding flange. The walls are fastened to the bracket. A fence is assembled to at least partially enclose the planter box, and the fence may be fastened to the planter box to help support the fence.

In accordance with another embodiment of the invention, there is provided a garden bed assembly kit, which includes a set of planter bed planter box brackets to help form planter box walls into a planter box. Each bracket may include at least one upstanding flange for being fastened to a face of one planter box wall, one horizontal flange for being fastened to the bottom edge of the wall, and a retainer spaced from the upright flange for receiving the wall therebetween.

Referring now to FIGS. 1 through 5 of the drawings, there is shown a garden bed assembly 10, which is constructed in accordance with an embodiment of the present invention. The assembly 10 includes a set of three raised garden bed planter boxes 12, 14 and 16 arranged in a U-shaped configuration. It should be understood by those skilled in the art that other arrangements of the planter boxes, and the number of planter boxes, may vary. Each planter box of the assembly 10 may be generally rectangular in shape, and various different sizes and shapes of the planter boxes may vary as will become apparent to those skilled in the art.

A set of brackets such as a corner bracket 18 and a T bracket 21 are provided to secure the walls of the boxes in place as hereinafter described in greater detail. Each planter box such as the planter box 12 is open at its top and contains soil or growing media such as the soil 19, for growing plants such as a plant 20.

A fence generally indicated at 23 at least partially surrounds the planter boxes to help protect the plants from unwanted pests from eating the plants. The fence 23 includes a set of open frame fence sections such as a pair of front fence sections 25 and 27, and a pair of longer side fence sections 29 and 32. A tall rear fence section 34 completes the enclosure and serves as a trellis for certain growing plants. A gate 36 is connected between a pair of upright posts 38 and 41 between the front fence sections 25 and 27. A gate latch 43 releasably secures the gate 36 in place.

It is to be understood that a table section may be included on one or more of the sections, or all of the sections can be the same height, if desired. The height of the sections, such as the sections 25, 27, 29, and 32 may all be substantially the same, and may vary in size, such as between about three feet and about seven feet.

An irrigation system generally indicated at 45 may be provided to supply water to the plants to facilitate their growth. One or more tool holders, such as a tool holder or hook 47 may be attached to one or more of the planter boxes of the fence 23 for conveniently holding garden tools such a garden tool 49 for use by the gardener.

Figure 5:
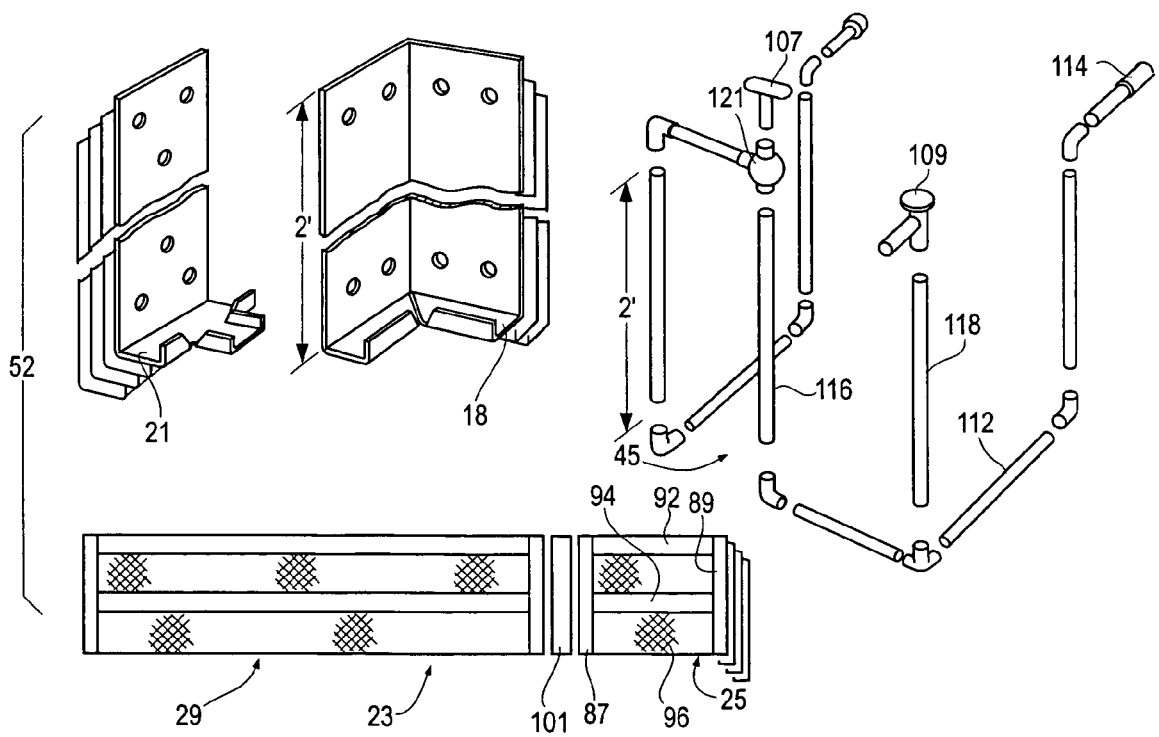
FIG. 5 is a pictorial view of a garden box assembly kit constructed according to a further embodiment of the invention.

Referring now to FIG. 5, there is shown a kit 52 which includes the various parts to assemble the garden bed assembly 10 of FIG. 1. The kit 52 may include a set of brackets for assembling the planter boxes, and the brackets may include the brackets 18 and 21. Optionally, the kit 52 may include the irrigation system 45. Optionally, the kit 52 may also include the fence 23 including the fence sections 25 and 29. It will become apparent to those skilled in the art that various combinations of the parts of the kit 52 may be included. Generally, however, it is desirable to not include the walls of the planter boxes in the kit, since those items can be purchased separately by the user and the kit 52 may be sent via a carrier to the purchaser.

Figure 4:
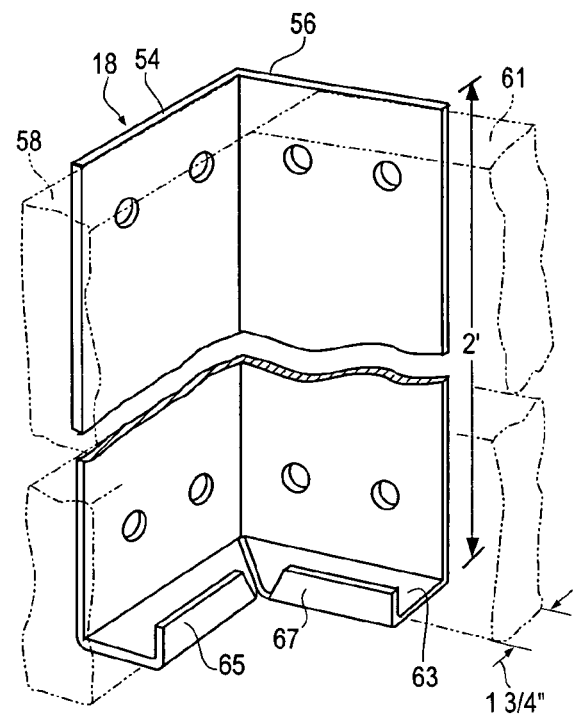
FIG. 4 is an enlarged pictorial view of a planter box T bracket.

Referring now to FIG. 4, the corner brackets such as the corner bracket 18 will now be described in greater detail for joining the ends of two planter box walls together at a corner. The bracket 18 generally comprises a pair of upstanding flanges 54 and 56, which are integrally connected together at a right angle and are perforated for receiving fastening devices such as screws. In this regard, the bracket 18 receives the ends of a pair of planter box boards or walls 58 and 61 at right angles to one another, and the perforated upstanding flanges can then be conveniently fastened thereto by suitable fastening devices such as screws (not shown).

An L-shaped horizontal flange 63 is integrally connected at right angles to the bottom edges of the upstanding flanges 54 and 56. The L-shaped horizontal flange 63 includes a pair of upstanding integrally connected flanges or retainers 65 and 67. The retainer 65 is parallel to and spaced from the upstanding flange 56 to receive the wall 61 therebetween for securing it in place to facilitate the fastening of the bracket 18 to the wall 61. Similarly, the upstanding retainer 67 is spaced from the upstanding flange 54 to receive the wall 58 therebetween to facilitate the fastening of the upstanding flange 54 thereto. The height of the upstanding flanges 54 and 56 are substantially the same as the height of the planter box walls. Both the height of the planter boxes and the bracket upstanding flanges may vary, and may, for example, be about 12 inches high, or about 24 inches high.

Figure 2:
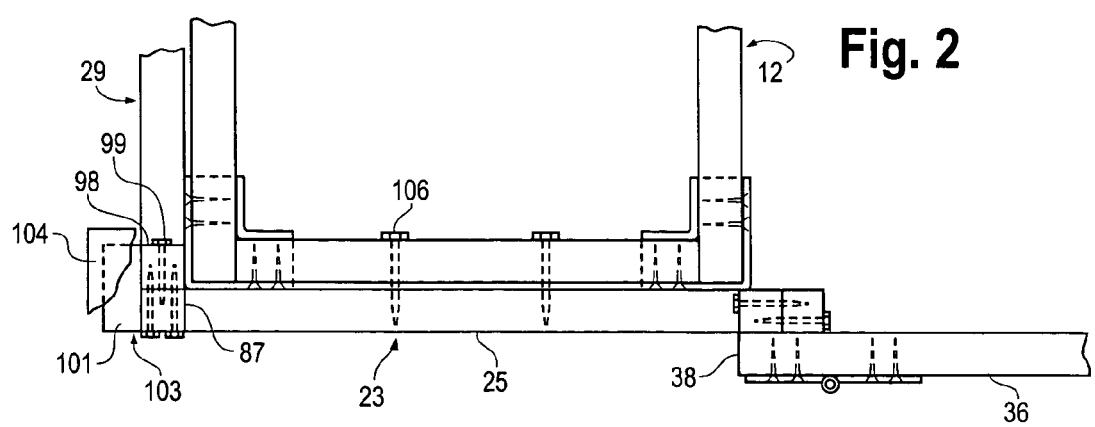
FIG. 2 is an enlarged fragmentary plan view of the assembly of FIG. 1.
Figure 3:
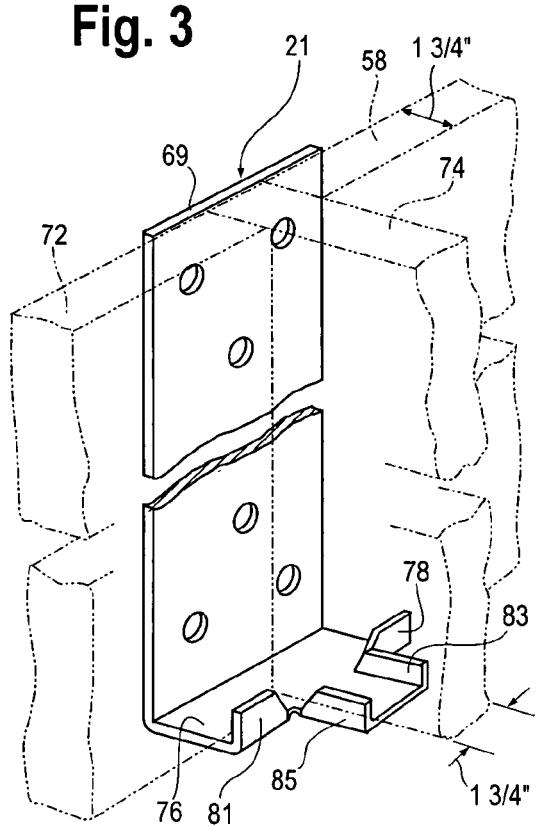
FIG. 3 is an enlarged pictorial view of a planter box corner bracket of the assembly of FIG. 1.

Referring now to FIG. 2, the T brackets such as the T bracket 21 will now be described in greater detail for joining together the ends of three planter box walls in a T-shaped configuration. The bracket 21 includes a single upstanding flange 69 which is adapted to be secured to three separate planter box walls such as the walls 58, 72 and 74. In this regard, the upstanding flange 69 is perforated to receive fastening devices such as screws (not shown) to secure the walls in a T-shaped configuration.

A T-shaped horizontal flange 76 is integrally connected to the bottom edge of the upstanding flange 69. An upstanding flange or retainer 78 is spaced from and parallel to the upstanding flange 69 to receive an end portion of the wall 58 therebetween while it is being fastened in place. Similarly, an upstanding flange or retainer 81 is spaced from and parallel to the upstanding flange 69 to receive the wall 72 therebetween while it is being fastened in place to the upstanding flange 69.

A pair of upstanding flanges or retainers 83 and 85 on the horizontal flange 76 are adapted to receive the wall 74 there between while it is being fastened in place to the flange 69. In this regard, screws or other fastening devices (not shown) fasten the flange 69 to an edge of the wall 74.

The upstanding flange 69 may vary in height in a similar manner as the upstanding flanges 54 and 56 of the corner bracket 18.

Considering now the fence sections in greater detail, the fence section 25 will now be described as being representative of the open frame constructions of the other fence sections forming the fence 23. The fence section 25 includes a pair of end rails 87 and 89 and a pair of cross rails 92 and 94 to provide a rectangular configuration for the fence section 25. Poultry wire, hardware cloth, or other open mesh fabric 96 is fastened by suitable means (not shown) to the backside of the fence section 25 to prevent unwanted pests from entering the assembly 10.

The end rail 87 may be fastened to an end rail 98 of the fence section 29 by suitable fastening devices such as a screw 99. A face rail 101 may be fastened to the end rails 87 and 98 to form a post 103. The post may include a cap block 104 shown partially in FIG. 2. The cap block 104 is provided for decorative purposes and to conceal, to a certain extent, the fact that the post 103 is composed of a set of three rails. The cap block 104 is similar to the cap block 105 (FIG. 1). Although only one cap block is shown in FIG. 1, there may be cap blocks (not shown) on each one of the intersections of the adjoining fence sections as well. In this manner, the fence 23 can be conveniently assembled without the use of posts and it has a finished as well as an aesthetically pleasing appearance.

As shown in FIG. 2, the fence 23 is fastened to the planter boxes by suitable fastening devices such as a screw 106. In this manner, the fence 23 is at least partially supported by the planter boxes. However, it is to be understood that the fence 23 may be supported in a conventional manner by concrete footings (not shown).

Referring now to FIGS. 1 and 5, the irrigation system 45 will now be considered in greater detail. The system 45 may include a timer 107 and a garden hose spigot 109. The timer 107 controls the supply of water to the plants in the planter boxes of the assembly 10. The spigot 109 enables the user to connect a conventional garden hose (not shown) for additional manual watering of the plants.

The system 45 may include a supply pipe 112 which may include a hose end pipefitting for attachment to a conventional garden hose to supply water to the irrigation system 45. It is to be understood that a permanent water supply may be attached to the end of the supply pipe 112 in place of the hose end pipefitting 114 for a more permanent installation instead of using a garden hose for supplying the water.

A pair of upright pipes 116 and 118 may supply the water from the supply pipe 112 to a valve 121 controlled by the timer 107, and to the hose spigot 109. The timer 107 controls the valve 121 connected in fluid communication to the pipe 116. The valve 121 may be connected in fluid communication with a set of discharge pipes 123 to supply the water under the control of the timer 107 to a soaker hose outlet 125, which may be connected to a series of perforated soaker hoses 127 disposed within the planter boxes for supplying water to the plants growing therein.

Figure 6:
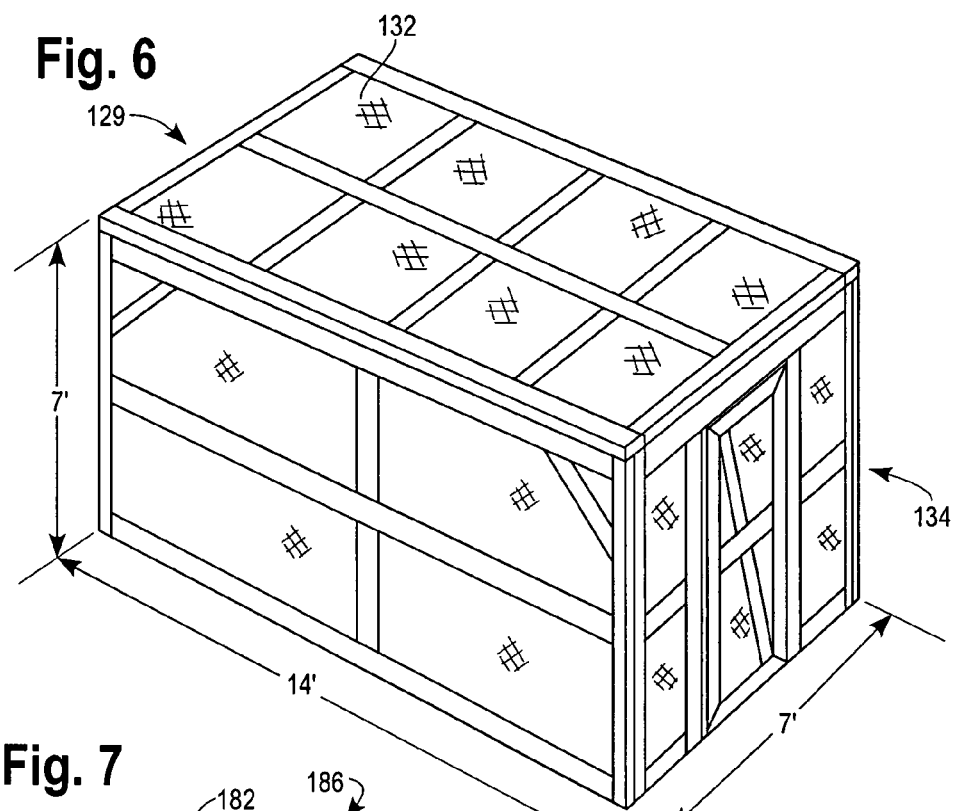
FIG. 6 is a pictorial view of another garden bed assembly constructed according to another embodiment of the invention.

Referring now to FIG. 6, there is shown another garden bed assembly 129, which is constructed in accordance with another embodiment of the present invention. The assembly 129 is generally similar to the assembly 10 of FIG. 1, except that the assembly 129 includes a roof 132 on the top of a fence 134, which is similar to the fence 23 of the assembly 10 of FIG. 1.

The assembly 129 includes at least one raised garden bed box (not shown), which may be similar to one or more of the raised garden bed boxes 12, 14 and 16 of FIG. 1. Each one of the raised garden bed boxes includes suitable planting soil or growing media (not shown) which may be similar to the box 12 of FIG. 1, for growing fruits or vegetables, or the like.

In the embodiments such as the assemblies 10 and 129, a floor (not shown) may extend under the vertical walls of the fence, and may be covered with a ground cover such as bark. The floor may be in the form of a mesh material such as poultry wire or hardware cloth, to prevent, or at least retard, the entrance into the enclosure by unwanted pests such as gophers.

An open mesh material such as the material 45 (FIG. 1) extends over the frame or fence sections of the assembly 129, and permits sunlight a well as pollinating bees to enter the enclosure while prohibiting unwanted creatures from gaining access thereto.

According to at least some of the disclosed embodiments of the invention, at least one of the garden bed boxes may be disposed adjacent to at least one of the vertical walls of the enclosure. In this manner, plants growing in the box can then affix themselves to the open mesh material of the vertical wall to serve as a trellis. Additionally, space is required to walk about within the fenced enclosure to enable a person to quickly enter the enclosure, such as via a gate, and harvest some of the plants in a quick and easy manner.

According to at least some of the embodiments of the invention, the boxes are generally rectangular in shape and are sufficiently narrow to permit a person to reach the plants growing in the box in a convenient manner. In the embodiment shown in FIGS. 1 through 5, there are three garden bed planter boxes arranged in a generally U-shaped configuration so that each one of the three boxes is disposed adjacent to at least one vertical wall. Also, there is sufficient space for a person to enter the fence 23 via the gate, and walk about the inside of the assembly and in areas or spaces defined partially by the three boxes so that a person can readily gain access to all three boxes. Additionally, the growing plants can use the open mesh material on all of the adjacent vertical walls as trellises.

Figure 7:
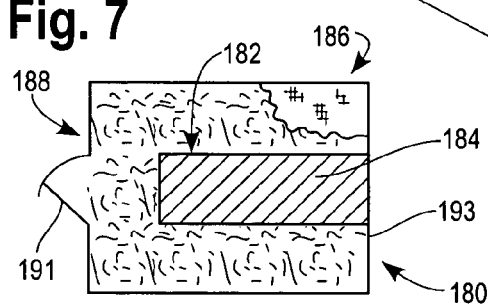
FIG. 7 is a diagrammatic plan view of yet another garden bed assembly constructed according to yet another embodiment of the invention.

Referring now to FIG. 7, there is shown another garden bed assembly 180, which is also constructed in accordance with an embodiment of the present invention. The assembly 180 includes a single raised garden bed planter box 182, which is generally rectangular in configuration and includes suitable planting soil or other growing media 184. A generally rectangular enclosure or fence 186 surrounds the box 182 and includes a front wall 188 having a gate 191. One side of the rectangular box 182 is disposed adjacent to a rear wall 193.

In general, the assembly 180 is similar to the assembly 10, except that the assembly 180 is generally smaller in size and has a single garden bed box.

Figure 8:
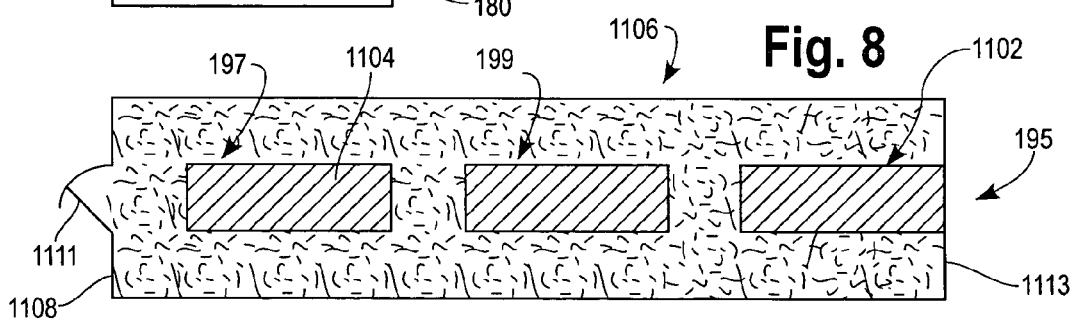
FIG. 8 is a diagrammatic plan view of still another garden bed assembly constructed according to still further embodiment of the invention.

Referring now to FIG. 8, there is shown yet another garden bed assembly 195, which is also constructed in accordance with yet another embodiment of the invention. The assembly 195 includes a set of three spaced-apart raised garden bed planter boxes 197, 199 and 1102, each containing planting soil such as planting soil 1104 in the box 197. The assembly 195 includes a generally rectangular enclosure 1106 having a front wall which includes a gate 1111. The box 1102 is disposed adjacent to a rear wall 1113 to permit the plants (not shown) growing in the box 1102 to use the rear wall 1113 as a trellis.

The boxes are each similar in size and shape to one another, and are spaced apart in a row.

Figure 9:
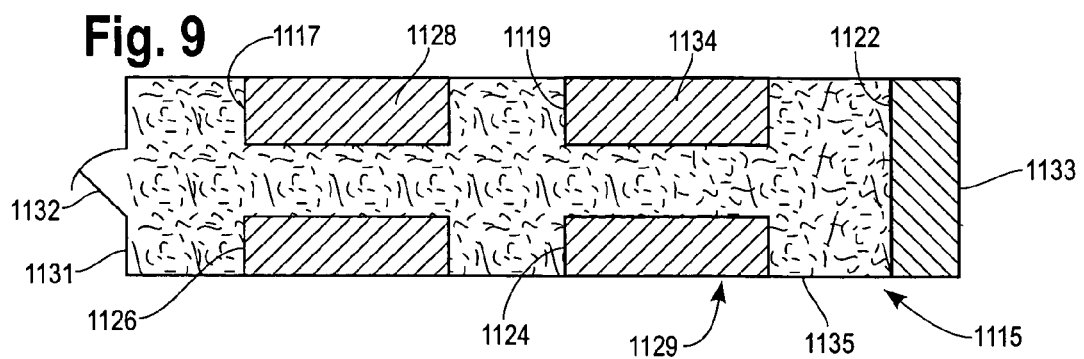
FIG. 9 is a diagrammatic plan view of yet a further garden bed assembly constructed according to still another embodiment of the present invention.

Referring now to FIG. 9, there is shown another garden bed assembly 1115, which is constructed in accordance with another embodiment of the invention. The assembly 1113 includes a set of five raised garden bed boxes 1117, 1119, 1122, 1124 and 1126. Each one of the boxes contains a suitable planting soil such as the soil 1128 in the box 1117.

A generally rectangular enclosure 1129 confines the five boxes and has a front wall 1131 with a gate 1132. Also, the enclosure includes a rear wall 1133 and a pair of side walls 1134 and 1135.

Each one of the boxes within the fence or enclosure 1129 is generally of the same size and shape, and are spaced apart from one another. Each box is disposed adjacent to one of the vertical walls of the fence or enclosure 1129.

In general, each one of the assemblies disclosed herein may be of any size or configuration, including triangular and circular. Also, the height of the vertical fence sections and the planter box walls may be of any suitable height. Also, the assembly may or may not include a roof. If a roof is included as shown in the embodiment of FIG. 6, the roof may be fixed to the side walls. The roof may also be removable, which may be preferable where the vertical walls are lower in height. Also, the gate may be optional, should the walls be sufficiently low in height so that a person can gain access to the interior of the enclosure by stepping over the top of the side walls.

While particular embodiments of the present invention have been disclosed, it is to be understood that various different modifications are passing and one contemplated within the true spirit and scope of the appended claims. For example, planter box walls could be composed of a variety of materials, such as wood, plastic, metal and other. There is no intention, therefore, of limitations to the exact abstract or disclosure herein presented.

What is claimed is:

1. A garden bed assembly, comprising:
   at least one planter box for holding planting media;
   the planter box having a plurality of walls, and a plurality of one-piece brackets, each bracket for helping to secure together two walls in an upstanding configuration;
   each bracket having at least one upstanding flange for being fastened to a face of one of the walls, having one horizontal flange integrally connected to the at least one upstanding flange and adjacent to the bottom edge of the one wall, and having a retainer integrally connected to the horizontal flange and spaced from the at least one upstanding flange for receiving the one wall therebetween;

at least one of the brackets being T-shaped to join ends of three walls of the planter box in a T-shape configuration by connecting a third wall at right angles to the two walls;

a fence for at least partially surrounding the planter box;

the fence including an arrangement of fence sections joined together at their ends to form posts, each fence section having a pair of end rails;

at least a portion of the fence sections being covered by wire mesh fencing;

one of the fence sections of the garden bed assembly having a substantially greater height than the other fence sections and at least partially covered with wire mesh fencing to serve as a planter trellis;

each fence section having horizontal portions and vertical end rails; and a face rail for being fastened to adjoining fence section vertical end rails to form a post, the face being a flat board and having a width substantially equal to the combined widths of the fastened to end rails.

2. A garden bed assembly according to claim 1, wherein the horizontal flange of the bracket is L shaped to provide a corner bracket.

3. A garden bed assembly according to claim 1, further including a gate to permit access to the structure.

4. A garden bed assembly according to claim 1, further including an irrigation system.

5. A garden bed assembly according to claim 1, further including a decorative cap block for attaching to and covering over the top edges of a pair of adjoining fence end rails and their face rail.

6. A garden bed assembly according to claim 1, wherein the fence includes a roof section.

7. A garden bed assembly according to claim 1, further including a plurality of planter boxes arranged in a U-shape.

8. A garden bed assembly according to claim 1, further including a plurality of planter boxes being spaced apart.

9. A garden bed assembly according to claim 1, further including a tool holder for attachment to one of the planter box walls.

* * * * *